Sept. 12, 1950     H. M. WEXBERG ET AL     2,522,477
RACK FOR SMOKING PIPES
Filed Oct. 31, 1946
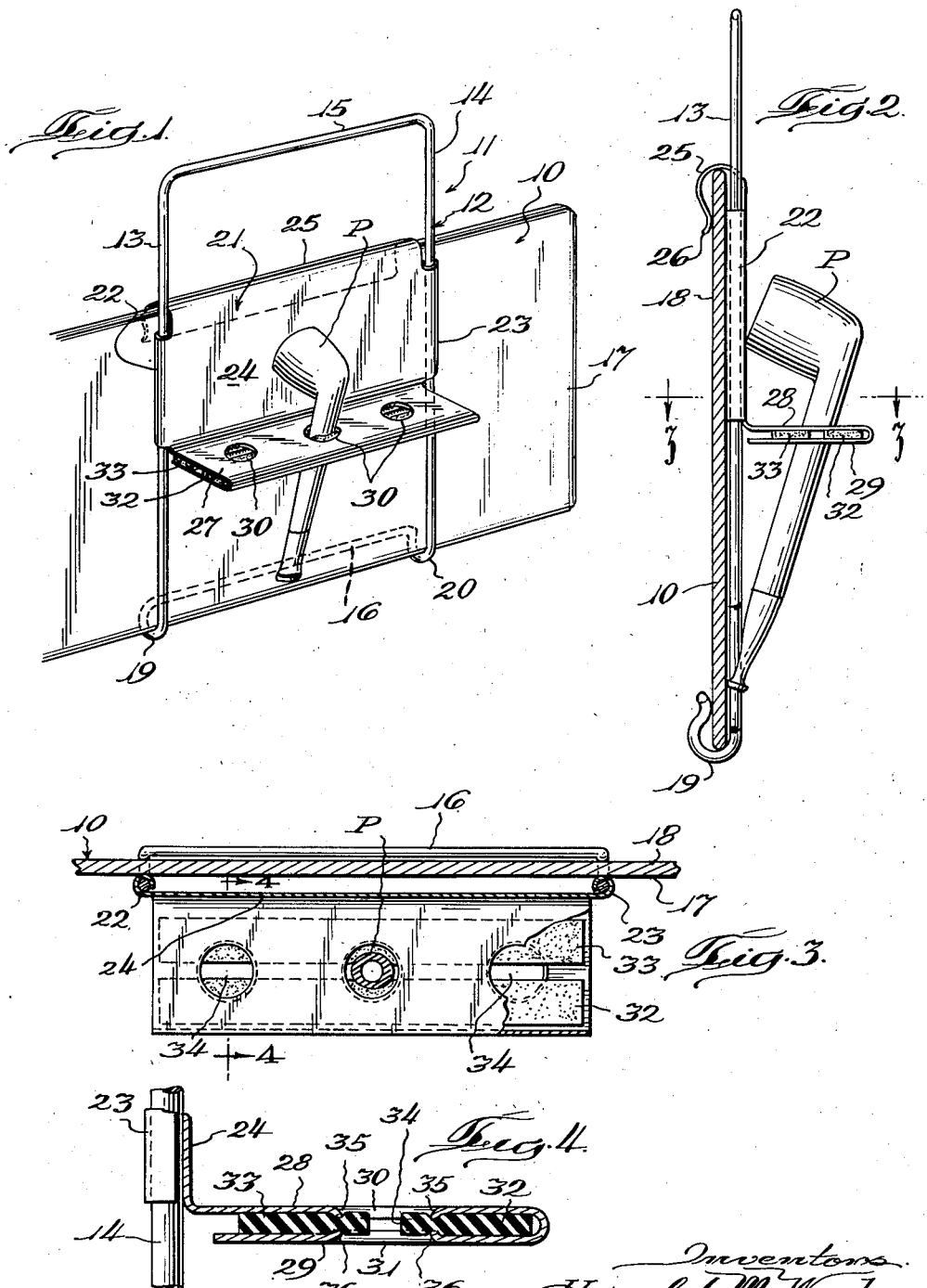

Patented Sept. 12, 1950

2,522,477

UNITED STATES PATENT OFFICE 2,522,477

RACK FOR SMOKING PIPES

Harold M. Wexberg, Chicago, Ill., and David R. Goodman, East Chicago, Ind.

Application October 31, 1946, Serial No. 706,920

2 Claims. (Cl. 224—42.42)

This invention relates generally to pipe racks and more particularly to a portable rack for smoking pipes which may be removably attached to the sun visor of an automobile.

In the course of driving an automobile it is inconvenient for the driver to smoke a pipe for the primary reason that stowage is a difficult problem. There are usually no places in the automobile where it is possible safely to keep pipes so that said pipes are available for use. If the driver is smoking while the car is moving along the road, there is no part of the dashboard of the ordinary automobile where the driver may rest the smoking pipe momentarily, but instead he must constantly carry same in his mouth or hold same in his hand while driving.

This invention comprises a device by means of which a plurality of smoking pipes may be held in a most convenient, yet most unobtrusive place within the automobile where same are readily available for the use of the driver. Said device comprises a rack which provides the driver a safe place for temporary stowage of a smoking pipe, lighted or otherwise, while driving.

The primary object of the invention is to provide a rack for smoking pipes capable of being removably attached to an automobile sun visor.

Another object of the invention is to provide a pipe rack capable of holding a plurality of smoking pipes convenient to the driver of the automobile on the rear surface of the sun visor of the automobile whereby same may normally be held hidden beneath the visor, and yet will be brought into view and made available when said visor is rotated downardly.

Another object of the invention is to provide a novel and improved rack for smoking pipes capable of being firmly held to the sun visor of an automobile and being readily adjustable whereby same may be accommodated upon various widths of sun visors.

Further objects of the invention are to provide a pipe rack of the character described in which the pipes are firmly held; in which the pipes may be engaged against the side of the sun visor to steady same; in which the bowl openings of the pipes are substantially blocked; and in which the pipes are held without danger of being marred or broken.

Still another object of the invention is to provide a pipe rack of the character described which is simple in construction, efficient in operation, and economical to manufacture of readily available materials.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of a rack for smoking pipes embodying the invention showing how same is adapted to be attached to a swingable automobile sun visor.

Fig. 2 is a view taken endwise of the visor of Fig. 1 and showing the pipe rack in side elevation, a portion of the wire frame member being broken away to show how the smoking pipe bit engages the visor.

Fig. 3 is a sectional view taken along the line 3—3 of Fig. 2 and in the direction indicated.

Fig. 4 is a sectional view taken along the line 4—4 of Fig. 3 and in the direction indicated.

The reference character 10 designates an automobile sun visor adapted to be swung downwardly from a position where same is lying in a plane substantially parallel to that of the roof of the automobile in which same is installed, to a position substantially perpendicular to the roof, whereby the driver's eyes are shaded from the rays of the sun entering the interior of the car through the windshield. Attached to the sun visor 10 there is shown a rack 11 for smoking pipes which is constructed in accordance with this invention. The presence of said rack 11 detracts in no manner from the efficiency of the sun visor in use as such.

The rack 11 comprises a wire frame member 12 having vertically arranged side track portions 13 and 14, a top cross bar 15 and a bottom cross bar 16. The track portions 13 and 14 and the top cross bar 15 all lie in substantially the same plane, and are intended to overlie the inner face 17 of the visor 10. The cross bar 16, however, is offset from the plane of the other portions of the frame member 12 and it is intended to overlie the outer face 18 of the visor 10. Said cross bar 16 is connected to the track members 13 and 14 by means of the upwardly curved loop portions 19 and 20. The loop portions serve as resilient spring-like devices whereby the cross bar 16 may act as a clip while said frame member 12 engages the edge of the visor 10.

The wire member 12 may be formed as a single continuous loop or may have a jointure therein, the manner of fabrication being merely a matter of choice for the most part. It is further not intended to limit the member 12 to being formed from wire since same may be made from bar stock, or may be stamped or fabricated in other manner from any of a wide variety of materials.

The tracks 13 and 14 carry therebetween and slidable thereon a pipe-carrying member designated generally 21 and having a substantially L-shaped cross section. At its sides the member 21 has elongated loops 22 and 23 formed thereon engaging the tracks 13 and 14 and adapted to slide therealong. The portion of the member 21 which extends between the loops 22 and 23 is preferably uninterrupted in order to present a solid wall to the bowl openings of the pipes which are adapted to engage thereagainst. One such pipe is shown in the drawing and is designated P. The smoking pipe P is only shown for illustrative purposes and does not form any part of the invention.

The top edge of the wall 24 is formed with a looped lip 25 which curves around and downwardly and then slightly outwardly as shown at 26. The lip 25 is adapted to engage against the outer face 18 of the visor 10 and have the portion 26 resiliently press against the same whereby the upper end of the member 21 is firmly clipped to the edge of the visor 10 opposite the edge engaged by the cross bar 16.

The bottom of the member 21 comprises a portion 27 which carries the smoking pipes. In the illustrated embodiment the pipe retainer portion 27 is arranged at an angle substantially perpendicular to the wall 24. This angle need not be a right angle, but may be slightly acute in which case the portion 27 is bent upwardly a desired amount instead of being formed as shown. The portion 27 is formed as a continuation of the wall 24 bent outwardly therefrom to form the upper wall 28 of the pipe retainer 27, and having an extension of the wall 28 bent under and upon the wall 28 to form the lower wall 29 spaced a distance below the wall 28. The walls 28 and 29 have registering openings 30 and 31 respectively formed therein and through which the pipe stems are adapted to extend. Sandwiched between the walls 28 and 29 and frictionally held thereby are arranged a pair of strips 32 and 33 which may be formed of any type of resilient material such as for example rubber. These strips are placed so that a rubber edged slot 34 is formed between each of the openings 30 and 31. In order further to firmly hold the strips 32 and 33 in place, each of the openings 30 and 31 is provided with inwardly upset bosses 35 and 36, respectively, and said strips are seized between the pairs of said bosses 35 and 36 during the formation of the pipe retainer 37.

When a pipe P is inserted in a slot 34, the rubber lips of the slot which are formed from the edges of the strips 32 and 33 are deformed and displaced by the pipe stem which is thus firmly grasped thereby. The mouth of the bowl of the pipe P engages the wall 24 thereby providing another point of support for the pipe. Certain shapes of pipes will have the bowl mouth completely closed off by the wall 24 whereby coals and ashes will be safely retained in the bowl of the pipe P even if the visor 10 is swung upwardly and out of the line of vision of the driver. The pipe stem may extend a distance downwardly sufficiently to cause the bit to engage the face 17 of the visor 10 and provide still another point of support.

It should be seen from the description that the invention provides means for readily and conveniently stowing and safely carrying smoking pipes in an automobile. It should also be seen how the member 21 may be moved along the tracks 13 and 14 of the member 12 so that the device may be adapted to be attached to practically any width of automobile sun visor.

It is believed that this invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of this invention as defined in the appended claims.

What is claimed and desired to secure by Letters Patent of the United States is:

1. A pipe rack adapted to be attached to the visor of an automobile comprising a frame member having side track portions and means for clipping same to one edge of said visor, a second member of generally angle shaped cross section, one arm adapted to lie substantially parallel to said visor and the second arm arranged at an angle thereto and having means for removably carrying smoking pipes therein, said first arm having means engaging said tracks whereby said second member is movable relative to said first member.

2. A pipe rack adapted to be attached to the visor of an automobile comprising a frame member having side track portions and means for clipping same to one edge of said visor, a second member of generally angle shaped cross section, one arm adapted to lie substantially parallel to said visor and the second arm arranged at an angle thereto and having means for removably carrying smoking pipes therein, said first arm having means engaging said tracks whereby said second member is movable relative to said first member, said second member also having means for clipping same to the opposite edge of said visor to hold said rack thereto.

HAROLD M. WEXBERG.
DAVID R. GOODMAN.

REFERENCES CITED

The following references are of record in the file of this patent:

UNITED STATES PATENTS

| Number | Name | Date |
|---|---|---|
| 695,380 | Duer | Mar. 11, 1902 |
| 1,618,027 | Vogler | Feb. 15, 1927 |
| 1,783,751 | Schubnell | Dec. 2, 1930 |
| 2,048,105 | Cobbs | July 21, 1936 |
| 2,061,937 | Fay | Nov. 24, 1936 |
| 2,066,851 | Noyes et al. | Jan. 5, 1937 |
| 2,135,191 | McBrody | Nov. 1, 1938 |
| 2,161,855 | Copell | June 13, 1939 |
| 2,181,324 | Glover | Nov. 28, 1939 |
| 2,211,879 | Cave | Aug. 20, 1940 |
| 2,255,973 | Hoobler | Sept. 16, 1941 |
| 2,411,053 | Ornsteen | Nov. 12, 1946 |